United States Patent [19]

Ylitervo et al.

[11] Patent Number: 5,726,981
[45] Date of Patent: Mar. 10, 1998

[54] METHODS FOR MAKING ACTIVE CHANNEL MEASUREMENTS IN A PERSONAL BASE STATION ENVIRONMENT

[75] Inventors: Matti Kalle Aukusti Ylitervo; Mika J. Vayrynen, both of Oulu, Finland

[73] Assignee: Nokia Mobile Phones Limited, Salo, Finland

[21] Appl. No.: 576,788

[22] Filed: Dec. 21, 1995

[51] Int. Cl.$^6$ .................................................. H04B 7/212
[52] U.S. Cl. ...................... 370/332; 379/60; 455/33.1; 370/310
[58] Field of Search ........................ 370/252, 277, 370/278, 332, 337, 310; 375/224, 227, 351; 379/58, 59, 60, 61, 62, 63; 455/9, 33.1, 33.2, 34.1, 67.1, 226.1, 226.2

[56] References Cited

U.S. PATENT DOCUMENTS

| | | | |
|---|---|---|---|
| 4,989,230 | 1/1991 | Gillig et al. | 379/61 |
| 5,214,687 | 5/1993 | Kansakoski et al. | 379/60 |
| 5,260,988 | 11/1993 | Schellinger et al. | 379/59 |
| 5,276,691 | 1/1994 | Kivari | 371/47.1 |
| 5,483,537 | 1/1996 | Dupuy | 370/337 |
| 5,574,976 | 11/1996 | Schellinger | 455/33.1 |

OTHER PUBLICATIONS

"TDMA Forum, Implementation Guide: Non–Public Mode Operation and Selection in IS–136 Compliant Mobile Stations", Version 2.0, Mar. 9, 1995.

*Primary Examiner*—Wellington Chin
*Assistant Examiner*—Soon-Dong Hyun
*Attorney, Agent, or Firm*—Perman & Green, LLP

[57] ABSTRACT

A wireless communications system (1) has at least one base station, such as a personal base station (5), and a plurality of mobile stations (10) capable of wireless slotted communications with the at least one personal base station. A method includes a step of periodically deactivating, for a predetermined period of time, a base station transmitter (32) from transmitting a RF signal to at least one MS. A next step, executed during the predetermined period of time, operates a base station receiver (34) to perform a received signal strength (RSS) measurement. In a first embodiment of this invention the step of deactivating includes a preliminary step of reserving a reverse slot for use by the base station, thereby insuring that a mobile station will not transmit during the reserved slot. In this case the RSS measurement occurs during the reserved slot. In a second embodiment of this invention the step of deactivating includes an initial step of transmitting at least a synchronizing data pattern during the predetermined interval before disabling the transmitter, thereby enabling a mobile station to maintain synchronization with the base station even through the transmitter is switched off.

21 Claims, 3 Drawing Sheets

BS TRANSMITTING

| SLOT 1 | SLOT 2 | SLOT 3 | SLOT 4 | SLOT 5 | SLOT 6 | SLOT 1 | SLOT 2 |
|---|---|---|---|---|---|---|---|

BS RECEIVING

| SLOT 5 | SLOT 6 | SLOT 1 | SLOT 2 | SLOT 3 | SLOT 4 | SLOT 5 | SLOT 6 |
|---|---|---|---|---|---|---|---|

|←— MP —→|

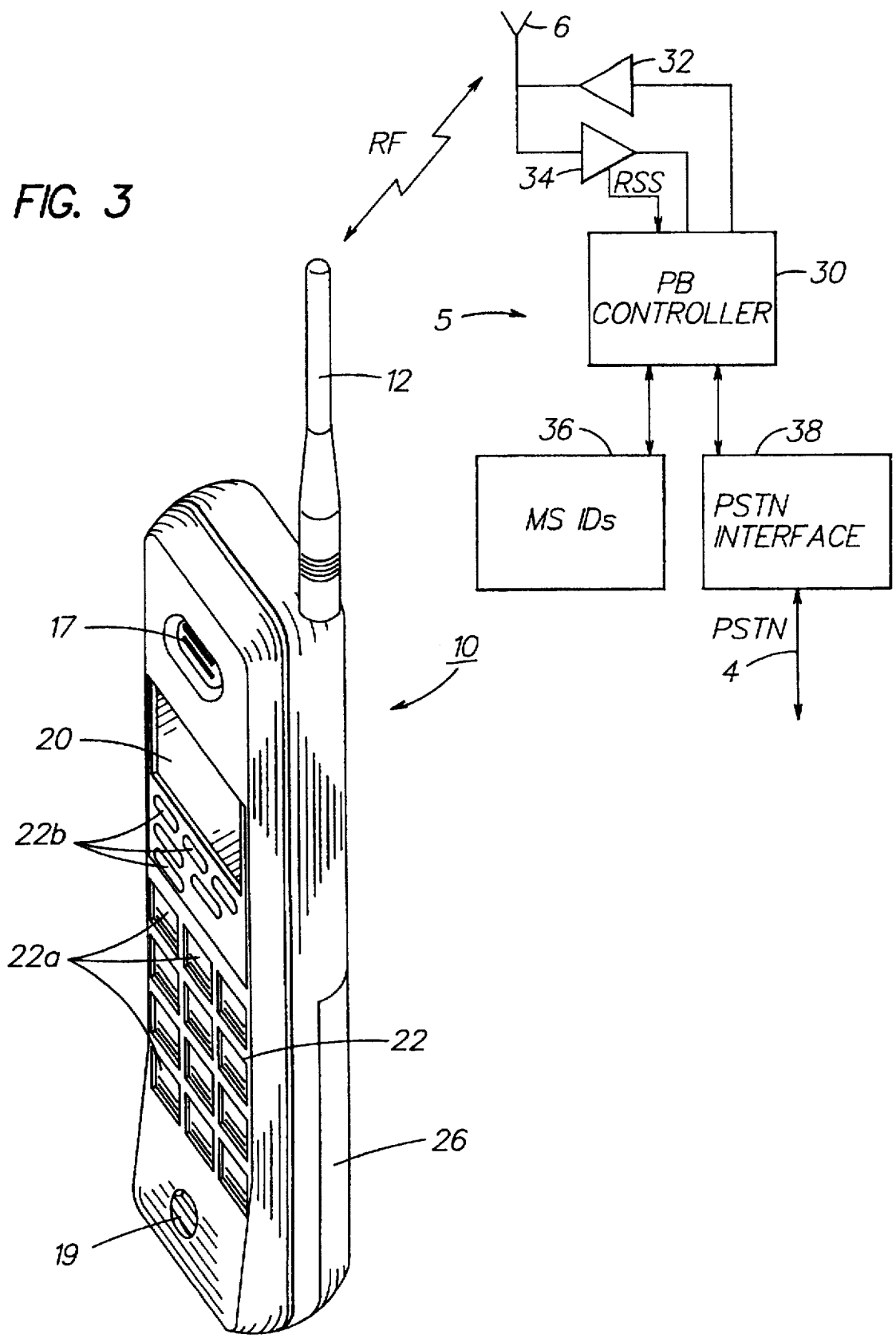

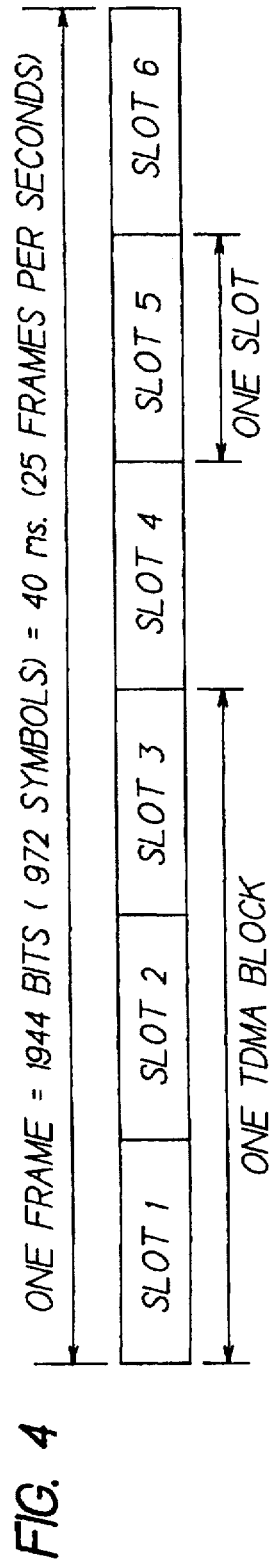
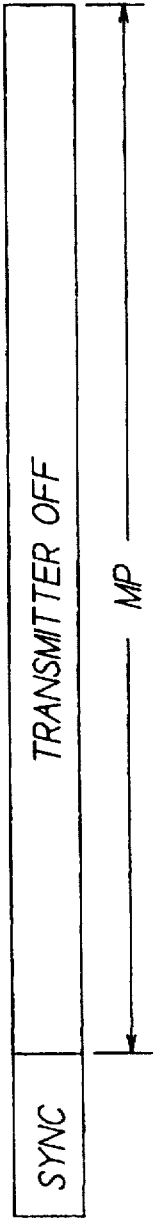

METHODS FOR MAKING ACTIVE CHANNEL MEASUREMENTS IN A PERSONAL BASE STATION ENVIRONMENT

FIELD OF THE INVENTION

This invention relates generally to wireless communications and, in particular, to the operation of a wireless non-public communications system or network having at least one mobile station (MS) which is coupled to a personal base station (PB).

BACKGROUND OF THE INVENTION

Communications with users of a cellular radiotelephone (also referred to herein as a mobile station (MS)) is accomplished through the use of cellular systems. By example, in the Time Division, Multiple Access (TDMA) system known as IS-136 (IS-136.1, Rev. 0, May 17, 1995) various network systems are classified into three groups: public, private, and residential networks. Private and residential networks may also be referred to collectively as non-public networks. Typically, there are two public cellular systems in one geographical area. In addition, there may be one or more non-public cellular systems available to users within the same geographical area.

The two public cellular systems within one geographical area are conventionally referred to as the A-system and the B-system. For example, in both the New York and Los Angeles metropolitan areas there are two public cellular systems. Each of these systems has its own unique identity, referred to as the SID (System Identification).

Generally, the cellular radiotelephone can operate at any given time in one of the two available public systems, and a display of the radiotelephone will typically have indicators (i.e., A and B icons) for indicating to the user which system is currently being used.

One purpose of the non-public systems is to provide specialized telecommunications services to radiotelephone users. The primary non-public system types include Wireless Business Systems, Limited Service Areas, and Residential Cellular Telephones.

In the Wireless Business System (WBS) application, connections for a closed group of users are typically switched through an existing PBX or through the public switched telephone network (PSTN). This type of system provides capabilities for offering specific features that can be highly integrated with other telecommunications services used by the group, with the goal of providing all of the capabilities of a desk telephone. Examples of these services include: voice mail integrated into an existing wired PBX; centralized speed dial lists; and simplified private network access.

In the Limited Service Area (LSA) application, a closed group of users may receive special billing considerations and custom features and services while within the coverage range of the private or semi-private system. Public subscribers not belonging to the closed group would receive service at standard billing rates. An LSA may be deployed at shopping malls, airports, sports facilities, hotels, etc. Full-time staff at such a facility may subscribe to the LSA service, while customers and itinerant visitors receive standard public wireless service over the same network.

The Residential Cellular Telephone (RCT) application is intended for use within a residence, and functions as an enhanced wireless telephone set. The RCT application is intended to provide users with a single handset which can be used as a cordless telephone when operated in conjunction with a home or neighborhood base station (referred to herein also as a personal base station (PB)) within a residential or office environment. The RCT application is also intended to provide a standard cellular mobile station when operating within the cellular environment, or as part of a Wireless Business System (WBS). When the handset is used as a conventional cordless telephone, the associated home or neighborhood base station communicates with the cellular network to assure that a user's calls are automatically forwarded to the user's landline telephone number.

The non-public systems are intended to operate in parallel with the public networks and, typically, the signalling in non-public systems is in compliance with the public system signalling. It is also expected that non-public systems will use system resources (channels) that are at a particular moment of time unused by the public system. That is, the non-public systems are adaptive in relation to their environment, and they dynamically reserve and release resources as required by the public system. At present, the operation of non-public systems is not taken into account in, by example, the IS-136 air interface. However a body known as the TDMA Forum has defined certain guidelines for operation in the non-public mode. In this regard reference can be made to a document entitled "TDMA Forum, Implementation Guide: Non-Public Mode Operation and Selection in IS-136 Compliant Mobile Stations", Version 2.0, Mar. 9, 1995, wherein a number of system operators have described non-public mode and selection requirements for mobile stations compliant with TIA Interim Standards IS-136 and IS-137.

There are, however, certain problems in non-public mode operation that affect the signalling between the MS and the base station/mobile switching center/internetworking function (BMI). For example, one such problem relates to low power, in-building operation. That is, and as was indicated above, many autonomous non-public systems will use dynamic channel allocation to determine current operating frequency or frequencies. In order to simplify these systems and reduce their cost, such non-public systems may not operate with a separate scanner, but may instead perform RF signal strength measurements using the same front-end and antenna as the PB. This requires the autonomous system's PB to turn off it's transmitter for some length of time in order to perform Received Signal Strength (RSS) measurements to verify a non-interference condition on the RF channel(s) that it is currently operating on. However, this mode of operation is currently not in compliance with IS-138, which states in Section 3.2.1.2 that the base station output power must be maintained at a constant level for the full duration of the frame when any slot is occupied. It can further be appreciated that a discontinuation of PB transmissions can result in a MS losing synchronization with the PB transmissions.

OBJECTS OF THE INVENTION

It is thus a first object of this invention to provide a method for enabling a base station, such as a personal base station, to perform RSS measurements.

It is a second object of this invention to provide a method for enabling a personal base station to perform RSS measurements when operating with full rate mobile stations.

It is a third object of this invention to provide a method for enabling a personal base station to perform RSS measurements when operating with half rate mobile stations.

SUMMARY OF THE INVENTION

The foregoing and other problems are overcome and the objects of the invention are realized by methods and apparatus in accordance with embodiments of this invention. In accordance with a method of this invention, and a system implementing the method, a wireless communications system has at least one base station, such as a personal base station, and at least one mobile station capable of wireless communications with the at least one personal base station. The method includes a step of periodically deactivating, for a predetermined period of time, a base station transmitter from transmitting a RF signal to at least one mobile station. A next step, executed during the predetermined period of time, operates a base station receiver to perform a received signal strength (RSS) measurement.

In the preferred embodiment of this invention the base station transmits and receives signals comprising repeating frames each consisting of a plurality of slots, and the predetermined period of time corresponds to a duration of time that equal to or less than a duration of one slot.

In a first embodiment of this invention the step of deactivating includes a preliminary step of reserving a reverse slot for use by the base station, thereby insuring that a mobile station will not transmit during the reserved reverse slot. In this case the step of making the RSS measurement occurs during the reserved slot.

In a second embodiment of this invention the step of deactivating includes an initial step of transmitting at least a synchronizing data pattern during the predetermined interval before disabling the transmitter, thereby enabling a mobile station to maintain synchronization with the base station even though the transmitter is switched off. In this case the RSS measurement is made for a period of time that is less than the duration of the slot.

BRIEF DESCRIPTION OF THE DRAWINGS

The above set forth and other features of the invention are made more apparent in the ensuing Detailed Description of the Invention when read in conjunction with the attached Drawings, wherein:

FIG. 3 illustrates the MS of FIG. 2, and also shows a simplified block diagram of the PB of FIG. 1;

FIG. 4 illustrates a conventional six slot TDMA frame structure that is suitable for practicing this invention;

FIG. 5 is a diagram illustrating the structure of a digital control channel (DCCH) time slot in the forward or downlink direction from the PB to the MS;

FIG. 6 illustrates an active channel measurement period in accordance with a first embodiment of this invention, specifically a full rate channel embodiment; and FIG. 7 illustrates an active channel measurement period in accordance with a second embodiment of this invention, specifically a half rate channel embodiment.

DETAILED DESCRIPTION OF THE INVENTION

Figure 1:
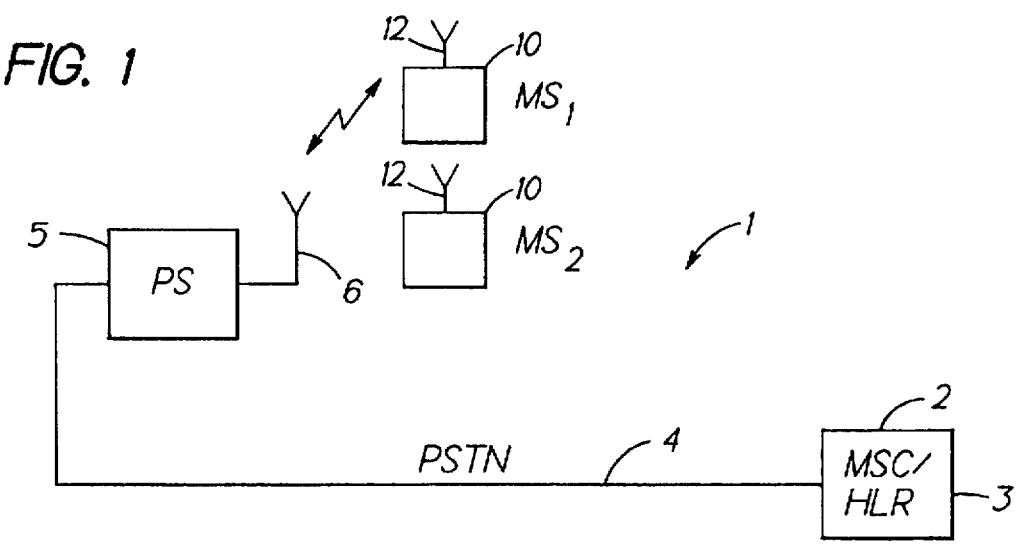
FIG. 1 is simplified block diagram of a telecommunications system that includes a PB and a plurality of MSs.

Referring first to FIG. 1 there is illustrated a simplified block diagram of a telecommunications system 1 that includes at least one PB 5 and a plurality of MSs 10. The system 1 includes a-portion of a cellular network comprised of a conventional Mobile Switching Center (MSC) 2 having a Home Location Register (HLR) 3. Connected to the MSC/HLR 2, 3 through the PSTN 4 is the PB 5. The PB 5 includes an antenna 6 for communicating with a corresponding antenna 12 of each MS 10, and has an associated set of transmit and receive frequencies. It is assumed for this discussion that the PB 5 is located within and/or adjacent to a building, such as a residence, office or the like, and has a limited range for servicing a restricted area.

Figure 2:
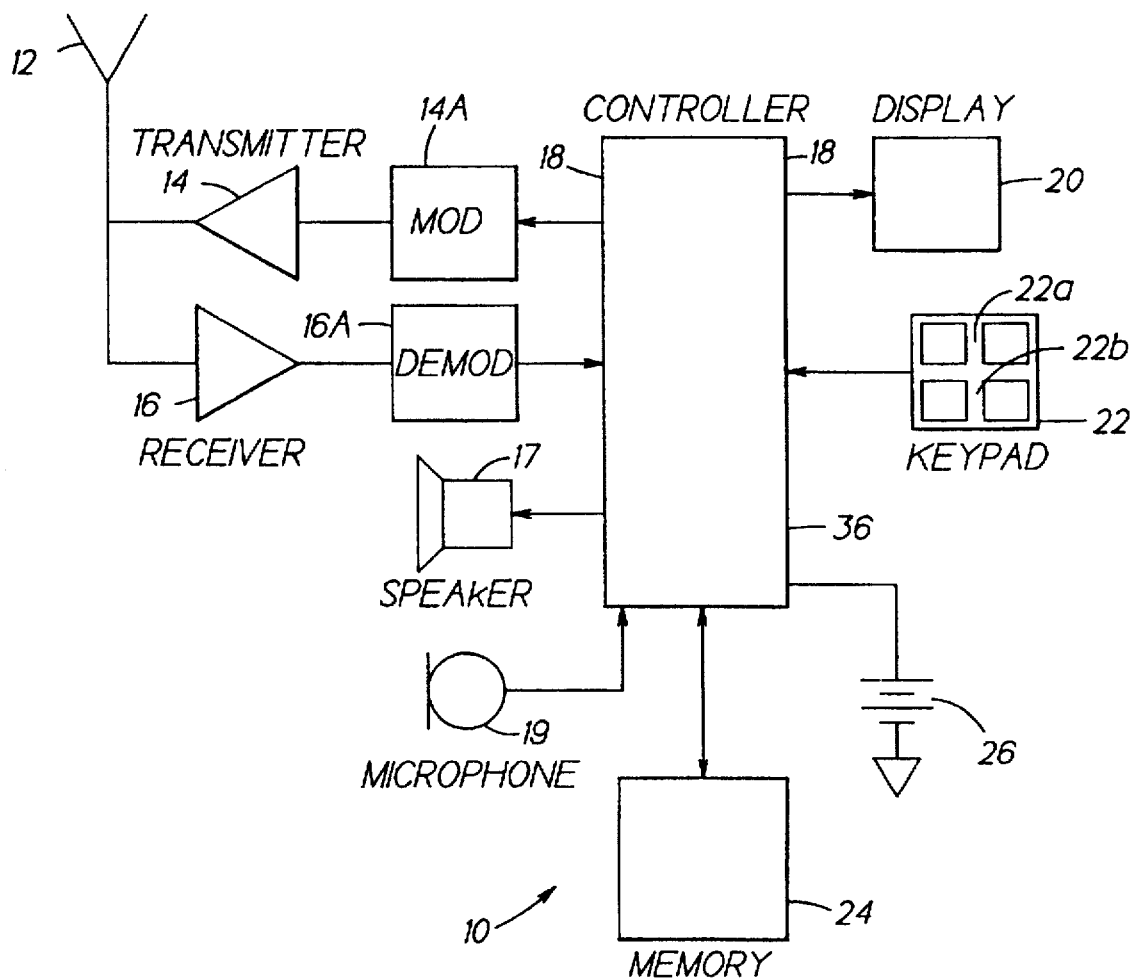
FIG. 2 is a simplified block diagram of one of the MSs of FIG. 1.

Reference is now made to FIGS. 2 and 3 for illustrating one of the MSs 10 of FIG. 1 that is suitable for practicing this invention. The MS 10 includes the antenna 12 for transmitting signals to and for receiving signals from the PB 5. The MS 10 includes a modulator (MOD) 14A, a transmitter 14, a receiver 16, a demodulator (DEMOD) 16A, and a controller 18 that provides signals to and receives signals from the transmitter 14 and receiver 16, respectively. These signals include signalling information in accordance with the air interface standard of the applicable cellular system, and also user speech and/or user generated data. The air interface standard is assumed for this invention to include at least a digital control channel (DCCH). A presently preferred air interface standard is that specified by IS-136 and IS-138. It should be noted, however, that the teaching of this invention is not limited for use with only particular air interface standard or standards.

A user interface of the MS 10 includes a conventional speaker 17, a conventional microphone 19, a display 20, and a user input device, typically a keypad 22, all of which are coupled to the controller 18. The keypad 22 includes the conventional numeric (0–9) and related keys (#,*) 22a, and also other keys 22b used for operating the MS 10. These other keys 22b include, by example, a SEND key, various menu scrolling and soft keys, and a PWR key.

The MS 10 also includes various memories, shown collectively as the memory 24, wherein are stored a plurality of constants and variables that are used by the controller 18 during the operation of the mobile terminal. For example, the memory 24 stores the values of various cellular system parameters and the number assignment module (NAM). An operating program for controlling the operation of MS controller 18 is also stored in the memory 24 (typically in a ROM device). The memory 24 also stores data, including user messages, that are received from the network prior to the display of the messages to the user. The MS 10 has a battery 26 for powering the various circuits that are required to operate the terminal.

The PB 5 is comprised of a PB controller 30 that is responsible for implementing the PB-related portion of the applicable air interface standard. Coupled to the PB controller 30 is a suitable modulating tuneable transmitter assembly 32, a demodulating tuneable receiver assembly 34, and a memory 36 storing a list of MS numbers and corresponding IDs, in addition to whatever other information is required during the operation of the PB controller 30. In particular, the memory 36 includes instructions that are executed by the PB controller 30 for implementing the applicable air interface standard, such as one based on or similar to IS-136. The PB 5 further includes a suitable PSTN interface unit 38. The receiver assembly 34 is assumed to include circuitry for performing a RSS measurement, and for reporting the result to the PB controller 30.

FIG. 4 illustrates a conventional six slot TDMA frame structure that is suitable for practicing this invention, while FIG. 5 is a diagram illustrating a Digital Control Channel (DCCH) slot format that is transmitted from the PB 5 to the MS 10. Reference in this regard can be had to FIG. 4—4 of IS-136.1. Moving from the beginning of the slot to the end of the slot, the DCCH slot consists of a 28-bit synchronization field (SYNC), a 12-bit first Shared Control Feedback (SCF) field, a first 130-bit data field (DATA), a 12-bit Super Frame Counter (CSFP) field, a second 130-bit data field (DATA), a 10-bit second SCF field, and a two bit reserved (RSVD) field. Three consecutive slots of the frame form one TDMA block and, in the personal base station environment, the first slot of the TDMA block is a slot used for the DCCH. As such, slots 1 and 4 are used for the DCCH. The other slots of the frame are used for full or half rate speech and/or data on digital traffic channels (DTC) conveyed in slots 2, 3, 5 and 6. It should be noted that in other embodiments of this invention that any of the slots may be used for the DCCH.

In accordance with a first embodiment of this invention, in particular a full rate embodiment, the PB 5 reserves one uplink DCCH Random Access (RACH) subchannel per frame from slots 1 or 4 for its own use, i.e. for making active channel measurements. As currently specified, the DCCH RACH subchannels are intended to be used only for the reverse link from the MS 10 to the base station. The RACH is used by the MSs 10 to request access to the system, and the RACH is divided into three or six subchannels to support three or six MSs 10.

Referring to FIG. 6, it can be noticed that there is an approximately two slot offset between the forward (transmitting) and reverse (receiving) PB frames. When a full rate TDMA carrier has one DCCH channel in slots 1 and 4, and DTC carriers in slot 2 (and 5) and 3 (and 6), there is no opportunity for the PB 5 to perform an RSSI measurement to detect possible interference. This is because the PB 5 must be either sending or receiving at all times, even if there is only one call in progress.

To overcome this problem the PB 5 reserves for itself at least one RACH subchannel in one of reverse link slots 1 or 4 that would normally be used by one of the MSs 10. As a result of reserving the RACH subchannel, the PB 5 is assured that at least one time slot will exist where the PB's transmitter 32 and receiver 34 are not required, so long as there is no traffic currently assigned to the corresponding forward DTC slot (e.g., slot 3). As is seen in the example of FIG. 6, the DCCH slot 1 in the receiving frame can thus be used for performing an RSS measurement (i.e., the DCCH slot 1 defines a measurement period (MP)), so long as there is no call assigned to the forward (transmitting) DTC slot 3 (i.e., the transmitter 32 can be idled), and the corresponding RACH subchannel is reserved by the PB 5 (i.e., the receiver 34 is not required for receiving MS transmissions since no MS will be transmitting on the reserved RACH subchannel). Since the PB 5 is not required to use the transmitter 32 to make a DTC slot transmission, the receiver 34 can be employed to make at least one RSS measurement during the slot. If interference is detected with a public system, the PB controller 30 is thereby enabled to reallocate frequency channels so as to avoid contention with, by example, the frequency channels in use by the public system.

Reference can be had to IS-136.1, Sections 4.4.2 and 4.11 for a presently preferred technique for reserving a RACH subchannel. In general, this is accomplished by setting SCF flags in the DCCH appropriately. In particular, the SCF field includes a Busy/Reserved/Idle (BRI) 6-bit field that is mapped into forward DCCH slots as shown in FIG. 4-5 of IS-136.1. As is defined in Section 5.3.2.1.1, a BRI flag is used to indicate whether the corresponding reverse DCCH RACH slot is busy, reserved, or idle. Section 4.11 of IS-136.1 describes in detail the subchannelling of the RACH and the use of the SCF flags.

In accordance with this aspect of the invention, by itself reserving a DCCH RACH subchannel by setting one of the BRI SCF flag bits, the PB 5 is able to measure the active channel that it is transmitting on whenever the corresponding DTC slots 3 and 6 are idle (no traffic). That is, when no transmission takes place during the DTC slot the transmitter 32 can be switched off for the duration of the slot, and the receiver 34 used to make RSS measurements during the corresponding time-aligned and reserved DCCH (RACH subchannel) slot. It is assumed, of course, that the MS controller 18 is responsive to the setting of BRI bits in the forward DCCH to not transmit on any RACH subchannel that is designated as being reserved.

This approach can be used also for half rate channels. However, and referring to FIG. 7, a second embodiment of this invention is preferred instead for use with half rate channels. In this embodiment the PB 5 optionally discontinues transmissions during a single inactive slot per frame. For this type of operation, the PB 5 discontinues transmission during a DCCH slot after transmitting at least the synchronization word portion (SYNC). That is, the SYNC word is transmitted, thereby enabling any MS monitoring the slot transmission to maintain synchronization, after which the transmitter 32 is switched off. For the remainder of the slot, or measurement period (MP), the receiver 34 is employed to make at least one RSS measurement for the active transmit channel.

It is preferred that when the PB operates in this manner that some transmitter ramp down interval is provided after transmission of the synchronization word, as is a transmitter ramp up interval prior to beginning transmission in the next slot. As such, the duration of the measurement period (MP) is reduced by an amount at least equal to the duration of the transmitter ramp down and ramp up intervals.

Although described in the context of a TDMA system that is based on or similar to IS-136, the teaching of this invention can be used as well with other types of TDMA systems, as well as with certain types of Code Division, Multiple Access systems, such as that specified by, for example, IS-95.

It should further be realized that the two embodiments can be combined, so as to both reserve a reverse slot for use by the base station, while also transmitting at least the synchronizing data portion on a corresponding forward slot.

Thus, although the invention has been particularly shown and described with respect to preferred embodiments thereof, it will be understood by those skilled in the art that changes in form and details may be made therein without departing from the scope and spirit of the invention.

What is claimed is:

1. A method of operating a wireless communications system having at least one base station and at least one mobile station capable of wireless communications with the at least one base station, comprising the steps of:

periodically deactivating, for a predetermined period of time following a transmission of a synchronizing data pattern, a base station transmitter from transmitting a RF signal to the at least one mobile station; and during the predetermined period of time, operating a base station receiver to perform a received signal strength measurement.

2. A method as set forth in claim 1, wherein the base station transmits and receives signals comprising repeating frames each consisting of a plurality of slots, and wherein the predetermined period of time corresponds to a duration of time that is less than a duration of one slot.

3. A method as set forth in claim 2, wherein the step of deactivating includes a preliminary step of reserving a reverse slot for use by the base station, thereby insuring that no mobile station will transmit during the reserved reverse slot, and wherein the step of operating occurs during the reserved reverse slot.

4. A method as set forth in claim 2, wherein the step of deactivating includes an initial step of transmitting at least the synchronizing data pattern at the beginning of a slot before disabling the transmitter.

5. A method of operating a wireless time division, multiple access communications system having at least one base station for transmitting, to at least one mobile station, a forward RF signal comprised of slotted control and traffic channels and for receiving, from the at least one mobile station, a reverse RF signal comprised of slotted control and traffic channels, wherein at least one forward traffic channel slot is aligned in time with a reverse control slot, comprising the steps of:

prior to a time when the base station is not required to transmit on the at least one forward traffic channel slot, reserving for the exclusive use of the base station the time aligned reverse control slot;

deactivating a base station transmitter from transmitting a RF signal on the at least one forward traffic channel slot; and during at least a portion of the reserved, time aligned reverse control slot, operating a base station receiver to perform a received signal strength measurement.

6. A method as set forth in claim 5, wherein the step of reserving reserves a random access channel subchannel for exclusive use by the base station, the random access channel subchannel being normally used by the at least one mobile station to request access to the system.

7. A method as set forth in claim 5, wherein the step of deactivating the base station transmitter includes a preliminary step of transmitting at least a synchronizing data pattern on the at least one forward traffic channel slot.

8. A method as set forth in claim 5, wherein the base station forms a portion of a non-public wireless communications system.

9. A method as set forth in claim 8, wherein the step of performing a received signal strength measurement attempts to measure a RF signal received from a public wireless communications system so as to determine if an interference condition exists between the non-public and the public wireless communications systems.

10. A method of operating a wireless time division, multiple access communications system having at least one base station for transmitting, to at least one mobile station, a forward RF signal comprised of slotted control and traffic channels and for receiving, from the at least one mobile station, a reverse RF signal comprised of slotted control and traffic channels, each slot comprising a synchronizing portion, comprising the steps of:

transmitting from the base station at least the synchronizing portion of a slot;

deactivating a base station transmitter after transmitting at least the synchronizing portion; and during a remainder of the slot, operating a base station receiver to perform a received signal strength measurement.

11. A method as set forth in claim 10, wherein the base station forms a portion of a non-public wireless communications system.

12. A method as set forth in claim 11, wherein the step of performing a received signal strength measurement attempts to measure a RF signal received from a public wireless communications system so as to determine if an interference condition exists between the non-public and the public wireless communications systems.

13. A method as set forth in claim 10 wherein the step of transmitting from the base station at least the synchronizing portion of a slot transmits at least the synchronizing portion of a digital control channel slot.

14. A wireless communications system having at least one base station and at least one mobile station capable of wireless communications with the at least one base station, said base station comprising:

means for periodically deactivating, for a predetermined period of time, a base station transmitter from transmitting a RF signal to the at least one mobile station;

means for transmitting at least a synchronizing data pattern before said deactivating means deactivates said transmitter; and means for operating, during the predetermined period of time, a base station receiver to perform a received signal strength measurement.

15. A system as set forth in claim 14, wherein the base station transmits and receives signals comprising repeating frames each consisting of a plurality of slots, and wherein the predetermined period of time corresponds to a duration of time that is less than a duration of one slot.

16. A system as set forth in claim 15, wherein said base station further comprises means for reserving a reverse slot for use by the base station, wherein said at least one mobile station is responsive to the slot being reserved for not transmitting during the reserved slot, and wherein said means for operating operates during the reserved slot.

17. A wireless time division, multiple access communications system having at least one base station for transmitting, to at least one mobile station, a forward RF signal comprised of slotted control and traffic channels and for receiving, from the at least one mobile station, a reverse RF signal comprised of slotted control and traffic channels, wherein at least one forward traffic channel slot is aligned in time with a reverse control slot, said system further comprising:

means, operable prior to a time when the base station is not required to transmit on the at least one forward traffic channel slot, for reserving for the exclusive use of the base station the time aligned reverse control slot;

means for deactivating a base station transmitter from transmitting a RF signal on the at least one forward traffic channel slot; and means, operable during at least a portion of the reserved, time aligned reverse control slot, for operating a base station receiver to perform a received signal strength measurement.

18. A system as set forth in claim 17, wherein said reserving means reserves a random access channel subchannel for exclusive use by the base station, the random access channel subchannel being normally used by the at least one mobile station to request access to the system.

19. A system as set forth in claim 17, and further comprising means for transmitting at least a synchronizing data pattern on the at least one forward traffic channel slot prior to an operation of said deactivating means.

20. A system as set forth in claim 17, wherein the base station forms a portion of a non-public wireless communications system.

21. A system as set forth in claim 20, wherein said base station receiver operating means attempts to measure a RF signal received from a public wireless communications system so as to determine if an interference condition exists between the non-public and the public wireless communications systems.

* * * * *